US008489875B2

(12) United States Patent
Zhao (10) Patent No.: US 8,489,875 B2
(45) Date of Patent: Jul. 16, 2013

(54) METHOD, SYSTEM AND APPARATUS FOR TRANSMITTING DHCP MESSAGES

(75) Inventor: Yuping Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 545 days.

(21) Appl. No.: 12/539,692

(22) Filed: Aug. 12, 2009

(65) Prior Publication Data

US 2010/0037054 A1 Feb. 11, 2010

Related U.S. Application Data

(63) Continuation-in-part of application No. PCT/CN2007/070769, filed on Sep. 25, 2007.

(30) Foreign Application Priority Data

Feb. 13, 2007 (CN) .......................... 2007 1 0079264

(51) Int. Cl.
*H04L 29/06* (2006.01)

(52) U.S. Cl.
USPC ............ 713/153; 713/100; 713/150; 709/222

(58) Field of Classification Search
USPC ........................... 713/170, 193, 153; 709/222
See application file for complete search history.

(56) References Cited

U.S. PATENT DOCUMENTS

| | | | |
|---|---|---|---|
| 6,452,925 B1 | 9/2002 | Sistanizadeh et al. | |
| 7,139,818 B1 * | 11/2006 | Kinnear et al. | 709/222 |
| 7,853,708 B2 * | 12/2010 | Townsley et al. | 709/230 |
| 2002/0178360 A1 * | 11/2002 | Wenocur et al. | 713/170 |
| 2004/0264439 A1 | 12/2004 | Doherty et al. | |
| 2005/0055575 A1 | 3/2005 | Evans et al. | |
| 2007/0101132 A1 * | 5/2007 | Cuellar et al. | 713/168 |

FOREIGN PATENT DOCUMENTS

| | | |
|---|---|---|
| CN | 1780244 | 5/2006 |
| CN | 1859409 | 11/2006 |
| CN | 1889577 A | 1/2007 |
| CN | 1893351 A | 1/2007 |
| CN | 101247356 B | 2/2011 |
| WO | WO 2008/010184 A2 | 1/2008 |

OTHER PUBLICATIONS

M Patrick Jan. 2001—DHCP Relay Agent Information Option.*
Johnson et al. Mar. 1, 2005—Subscriber Suboption for the Dynamic Host Configuration (DHCP) Relay agent option (RFC3993).*
European Search Report of the European Searching Authority for EP 07816960.4, mailed Apr. 27, 2010, 9 pgs.
Chinese Office Action dated May 27, 2010, in related Chinese Application No. 200710079264.0, with English translation. 7 pgs.

(Continued)

*Primary Examiner* — Jung Kim
*Assistant Examiner* — Tri Tran
(74) *Attorney, Agent, or Firm* — Staas & Halsey LLP (57) ABSTRACT

Methods, systems and devices for transmitting DHCP message are provided according to the present invention so that encrypted transmission of user sensitive information is achieved. The method includes receiving, by a Dynamic Host Configuration Protocol (DHCP) server, a DHCP request from a DHCP relay agent, wherein the request carries encrypted relay agent options; decrypting, by the DHCP server, the encrypted relay agent options to obtain the relay agent options. With the present invention, safe transmission of the user sensitive information in the DHCP message is ensured.

8 Claims, 2 Drawing Sheets

OTHER PUBLICATIONS

Patent Cooperation Treaty, Written Opinion of the International Searching Authority for Application No. PCT/CN2007/070979, mailed Jan. 24, 2008 6 pgs.

EPO Examination Report dated Jun. 15, 2012, issued in related European Application No. 07816960.4, Huawei Technologies Co., Ltd. (7 pages).

* cited by examiner

METHOD, SYSTEM AND APPARATUS FOR TRANSMITTING DHCP MESSAGES

CROSS-REFERENCE TO RELATED APPLICATIONS

This application is a Continuation-in-Part of International Application No. PCT/CN2007/070769, filed on Sep. 25, 2007, which claims the benefit of Chinese Application No. 200710079264.0, filed on Feb. 13, 2007, both of which are hereby incorporated by reference in their entireties.

FIELD OF THE INVENTION

The present invention relates to communication field, and more specifically to a method, a system and a device for transmitting DHCP messages.

BACKGROUND

Dynamic Host Configuration Protocol (DHCP) message is used in Internet so that a server may allocate configuration information to a host in the network. The configuration information contains dynamically allocated network addresses and additional configuration options, wherein the configuration options include Domain Name Server (DNS) addresses, physical locations of Internet hosts, and so forth. The additional configuration options are encapsulated in DHCP options and are transmitted in plain text.

When a host (a DHCP client) is accessing the network, the host first initiates a request in search of a DHCP server in the network, requesting the DHCP server to allocate a network address, wherein the request may include requested additional configuration options. Upon receipt of the request from the DHCP client, the DHCP server in the network transmits a message including an allocated network address and the additional configuration information to the DHCP client, wherein the additional configuration information is encapsulated in the configuration options of the message for transmission. In the case that the DHCP client and the DHCP server are not located on a same network segment, there may be a DHCP relay agent between them. The DHCP client initiates a request to the DHCP relay agent, and the DHCP relay agent adds additional information upon receipt of the request from the DHCP client to assist the DHCP server to implement network address selection and parameters configuration. The additional information is encapsulated in relay agent options, and is stored in different relay agent options respectively. After adding the additional information into the request, the DHCP relay agent forwards the request to the DHCP server. The DHCP server responds to the DHCP relay agent a message carrying additional information, network address and attached configuration options. And then the DHCP relay agent sends the message carrying additional information, network address and attached configuration options to the DHCP client. There are some circumstances that the DHCP relay agent may send a DHCP request to the DHCP server, requesting to update information stored in the DHCP relay agent, wherein the request carries the relay agent options added by the DHCP relay agent. The DHCP server may respond to the DHCP relay agent a message carrying the relay agent options according to the request sent from the DHCP relay agent.

There is multitudinous configuration information in the additional configuration options transmitted by the DHCP server. Some user sensitive information, the physical location of a user, for instance, might be included therein, and each configuration option corresponds to one piece of user sensitive information. When the DHCP relay agent forwards the request, some user sensitive information such as authentication information may also be added and transmitted to the DHCP server. Since the user sensitive information is transmitted in plain text, it is at a high risk of being stolen during transmission. As a result, this fails to keep the user sensitive information in privacy.

SUMMARY

Methods, systems and devices for transmitting DHCP messages are provided according to embodiments of the present invention in order to assure the safety of information carried in the DHCP message.

The embodiments of the present invention are implemented by the following technical solutions. A method for transmitting DHCP messages is provided according to present invention, which includes:

receiving, by a Dynamic Host Configuration Protocol (DHCP) server, a DHCP request from a DHCP relay agent, wherein the request carries encrypted relay agent options; and decrypting, by the DHCP server, the encrypted relay agent options to obtain the relay agent options.

Another method for transmitting DHCP message is also provided according to present invention, which includes:

encrypting relay agent options by a DHCP relay agent; and sending, by the DHCP relay agent, to a DHCP server a request containing the encrypted relay agent options.

A DHCP relay agent for transmitting DHCP message is also provided according to present invention, which includes:

Means for encrypting relay agent options and forwarding a request containing the encrypted relay agent options to a DHCP server.

A system for transmitting DHCP message is also provided according to present invention, which includes:

a DHCP relay agent, configured to encrypt relay agent options and to send to a DHCP server a request in which the encrypted relay agent options are carried; and a DHCP server, configured to receive a request from a DHCP client, wherein the request carries encrypted relay agent options; to decrypt the encrypted relay agent options; and to obtain the relay agent options based on a decryption result.

A DHCP server is also provided according to the present invention, which includes:

a message receiving unit, configured to receive a request from a DHCP client, wherein the request carries encrypted relay agent options;

a decrypting unit, configured to decrypt the encrypted relay agent options; and an information acquiring unit, configured to obtain the relay agent options based on a decryption result conducted by the decrypting unit.

It is noted from the above technical solutions that according to the embodiments of the present invention, upon receipt of the request from the DHCP client or the DHCP relay agent, the DHCP server encrypts the configuration options based on the configurations and responds them to the DHCP client or the DHCP relay agent. As a result, encrypted transmission of the user sensitive information is achieved, thereby ensuring safe transmission of the sensitive information through network.

DETAILED DESCRIPTION

Methods and systems for transmitting DHCP messages are provided according to embodiments of the present invention, which may ensure safe transmission of user sensitive information in the DHCP message.

Specific embodiments of the present invention will be described as follows.

Embodiment 1 is an embodiment illustrating a method for directly transmitting DHCP messages between a DHCP client and a DHCP server.

Figure 1:
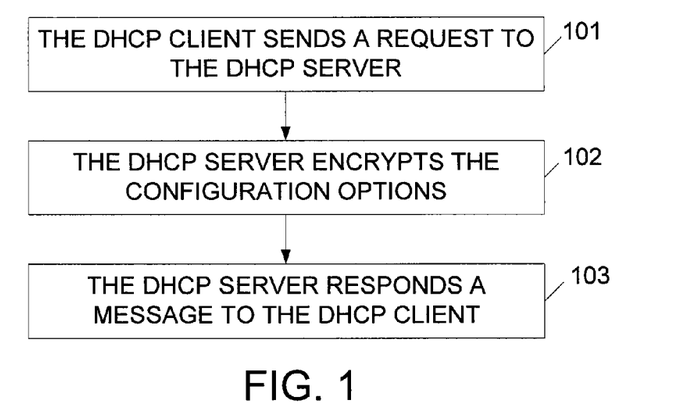
FIG. 1 is a flowchart of a method for transmitting DHCP messages between a DHCP client and a DHCP server according to an embodiment of the present invention.

Referring to FIG. 1, FIG. 1 is a flowchart of a method for transmitting DHCP message between a DHCP client and a DHCP server according to an embodiment of the present invention.

The DHCP client and the DHCP server may obtain a key of the client and the server in a manual configuration manner, wherein a same encryption algorithm is adopted by the client and the server.

101: The DHCP client initiates a request to the DHCP server.

In the request, the DHCP client may select and identify the configuration options which require encryption. The request to encrypt the configuration options may be implemented by modifying existing configuration options and adding new configuration options.

(1) The solution of modifying existing configuration options is as follows.

In DHCP, a format of the configuration options is as follows: (options of the configuration are named configuration options as below)

| Code | Len | Data... |
|------|-----|---------| where Code represents codes of the configuration options, Len represents the length of the configuration options, and Data represents data stored in the configuration options.

A format of the modified configuration options is as follows.

| Code | Len | Flag | Algorithm |
|------|-----|------|-----------|
| Key  |     | Data... |        |

The Flag field is added to identify whether the configuration options need to be encrypted. For instance, a Flag of 0 represents that there is no need to encrypt the configuration options while a Flag of 1 represents that there is a request to encrypt the configuration options. The Key field indicates an encryption key (might be a key index). The Algorithm field indicates an encryption algorithm. When a user requests to encrypt user sensitive information corresponding to the configuration options, the Flag field in the configuration options in the request is set to 1.

The DHCP client requests the DHCP server to encrypt option 123, option 77 and option 67 when the configuration options are responded: formats of the configuration options which require encryption namely option 123, option 77 and option 67 in the request sent from the DHCP client to the DHCP server are as follows, wherein the Algorithm indicates an encryption algorithm.

The format of the configuration option 123 is as follows:

| 123 | Len | 1 | Algorithm |
|-----|-----|---|-----------|
| 0   |     | Data... | |

The format of the configuration option 77 is as follows:

| 77 | Len | 1 | Algorithm |
|----|-----|---|-----------|
| 0  |     | Data... | |

The format of the configuration option 67 is as follows:

| 67 | Len | 1 | Algorithm |
|----|-----|---|-----------|
| 0  |     | Data... | |

(2) The solution of adding new configuration options is as follows.

In DHCP, a format of the configuration options is as follows:

| Code | Len | Data... |
|------|-----|---------| where Code represents codes of the configuration options, Len represents the length of the configuration options, and Data represents data stored in the configuration options. A format of the new configuration options is as follows.

| Code | Len | Key | Algorithm |
|------|-----|-----|-----------|
| C1   | C2  | C3  | ...       |

The Key field indicates an encryption key (might be a key index or a key identification). The Algorithm field indicates an encryption algorithm. The C1, C2 and C3 represent codes of the configuration options which require encryption by the DHCP client when the DHCP responds.

The DHCP client requests the DHCP server to encrypt option 123, option 77 and option 67 when the configuration options are responded. The DHCP client sends to the DHCP server a request into which the configuration options with the above format are added. The Key field is set to 0 (indicating that no encryption key is appointed). The format of the added configuration options is as follows:

| Code | Len | 0 | Algorithm |
|------|-----|---|-----------|
| 123  | 77  | 67| ...       |

A corresponding encryption algorithm is filled in the Algorithm field.

102: The configuration options are encrypted by the DHCP server.

After the DHCP server receives the request from the DHCP client, if the user of the DHCP client does not select or identify configuration options for encryption, then the DHCP server will encrypt the configuration options which require encryption based on previous settings in the DHCP server which are set by the user requesting for the encryption of the configuration options. If the user of the DHCP client selects and identifies configuration options which require encryption, then the DHCP server will also encrypt the configuration options which are selected and identified for encryption by the user, based on the configuration options which require encryption as previously set in the DHCP server by the user.

The encryption procedures are specified as follows.

After the DHCP server receives the request from the DHCP client, options 22, 23 and 34 in the DHCP server are previously set for encryption by the user, which require encryption with a key having an index of 2.

When the solution of modifying existing configuration options is adopted, the formats of the configuration options in a message containing the encrypted configuration options responded by the DHCP server are as follows, wherein the Algorithm indicates an encryption algorithm.

The format of the configuration option 22 is as follows:

| 22 | Len | 1 | Algorithm |
|----|-----|---|-----------|
| 2  | Data... |

The format of the configuration option 23 is as follows:

| 23 | Len | 1 | Algorithm |
|----|-----|---|-----------|
| 2  | Data... |

The format of the configuration option 34 is as follows:

| 34 | Len | 1 | Algorithm |
|----|-----|---|-----------|
| 2  | Data... |

The Key fields are set to 2 (indicating that a key with an index of 2 is used for encryption). In this solution, different indexes may be used to encrypt options 22, 23, 34, wherein a longer key may be used to encrypt an option requesting for a higher protection level.

When the solution of adding the new configuration options is adopted, the configuration options in the responded message from the DHCP server to the DHCP client are encrypted configuration options with a format as follows:

| Code | Len | 3 | Algorithm |
|------|-----|---|-----------|
| 22   | 23  | 34| ...       | where the Key field is set to 3 (indicating that a key with an index of 3 is used for encryption). In this solution, the same key is used to encrypt options 22, 23 and 34. In other words, for those configuration option's codes in the same configuration option added, the same key is used therein for encrypting those configuration options, whereas for options using different encryption keys, additional configuration options may be added and other keys may be used.

If the user of the DHCP client selects and identifies configuration options requesting for encryption, the DHCP server simultaneously encrypts the configuration options which are identified for encryption in the request, such as the configuration options requesting for encryption in the step 101. The DHCP server encrypts option 123, option 77 and option 67 using a key with an index of 2: the DHCP server sends to the DHCP client a message in which encryption information of the options requesting for encryption in the step 101 is carried.

When the solution of modifying fields in the configuration options is adopted, the formats of the configuration options in a message containing the encrypted configuration options responded by the DHCP server are as follows, wherein the Algorithm indicates an encryption algorithm.

The format of the configuration option 123 is as follows:

| 123 | Len | 1 | Algorithm |
|-----|-----|---|-----------|
| 2   | Data... |

The format of the configuration option 77 is as follows:

| 77 | Len | 1 | Algorithm |
|----|-----|---|-----------|
| 2  | Data... |

The format of the configuration option 67 is as follows:

| 67 | Len | 1 | Algorithm |
|----|-----|---|-----------|
| 2  | Data... |

The Key fields are set to 2 (indicating that a key with an index of 2 is used for encryption). In this solution, different indexes may be used to encrypt options 123, 77, 67, wherein a longer key may be used to encrypt an option requesting for a higher protection level.

When the solution of adding new configuration options is adopted, encrypted configuration options are added into the responded message from the DHCP server to the DHCP client with some DHCP options which have a format as follows:

| Code | Len | 3 | Algorithm |
|------|-----|---|-----------|
| 123  | 77  | 67| ...       | where the Key field is set to 3 (indicating that a key with an index of 3 is used for encryption). In this solution, the same key is used to encrypt options 123, 77 and 67. In other words, for those configuration option's codes in the same configuration option added, the same key is used therein for encryption of those configuration options, whereas for options using different encryption keys, the additional configuration options may be added and others keys may be used.

103: The DHCP server responds a message to the DHCP client.

So far, the transmission of the user sensitive information in the DHCP message is completed.

In the case that the DHCP client and the DHCP server are not located on a same network segment, a DHCP relay agent may be provided between them.

Embodiment 2 is an embodiment illustrating a method for transmitting DHCP message where there is a DHCP relay agent between a DHCP client and a DHCP server.

Figure 2:
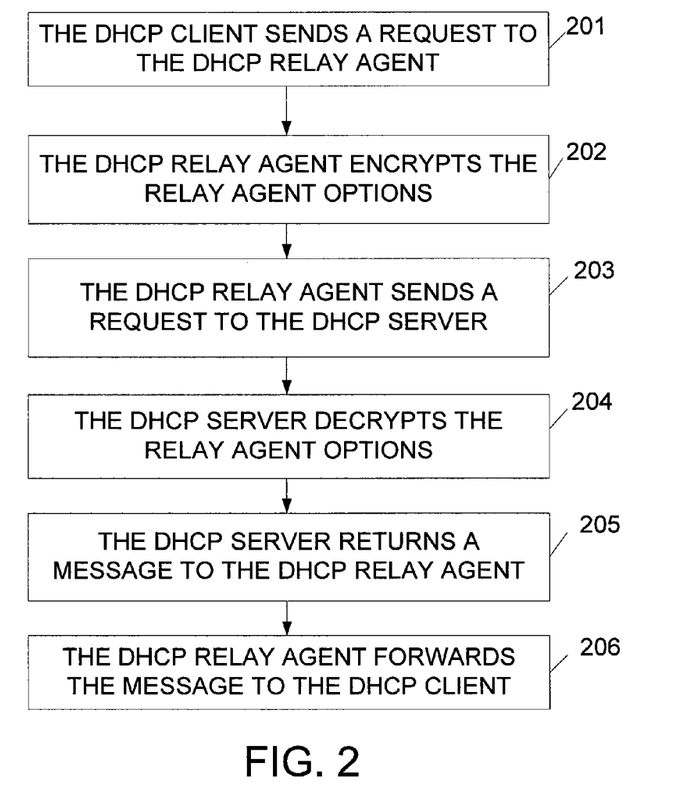
FIG. 2 is a flowchart of a method for transmitting DHCP messages where a DHCP relay agent exists between a DHCP client and a DHCP server according to an embodiment of the present invention.

Referring to FIG. 2, FIG. 2 is a flowchart of a method for transmitting DHCP message where there is a DHCP relay agent between a DHCP client and a DHCP server according to an embodiment of the present invention.

The DHCP client and the DHCP server may obtain a key of the client and the server in a manual configuration manner, wherein a same encryption algorithm is adopted by the client and the server.

201: The DHCP client initiates a request to the DHCP relay agent.

In the request, the DHCP client may select and identify the configuration options which require encryption. The identification for the request to encrypt the configuration options may be implemented by modifying existing configuration options and adding new configuration options.

(1) The solution of modifying existing configuration options is as follows:

In DHCP, a format of the configuration options is as follows: (options of the configuration are named configuration options as below)

| Code | Len | Data... |
|------|-----|---------| where Code represents codes of the configuration options, Len represents the length of the configuration options, and Data represents data stored in the configuration options.

A format of modified configuration options is as follows.

| Code | Len | Flag | Algorithm |
|------|-----|------|-----------|
| Key  |     | Data... |       |

The Flag field is added to identify whether the configuration options need to be encrypted. For instance, a Flag of 0 represents that there is no need to encrypt the configuration options while a Flag of 1 represents that there is a request to encrypt the configuration options. The Key field indicates an encryption key (might be a key index or a key identification). The Algorithm field indicates an encryption algorithm. When a user requests to encrypt user sensitive information corresponding to the configuration options, the Flag field in the configuration options in the request is set to 1.

The DHCP client requests the DHCP server to encrypt option 123, option 77 and option 67 when the configuration options are responded: formats of the configuration options which require encryption namely option 123, option 77 and option 67 in the request from the DHCP client to the DHCP server are as follows, wherein the Algorithm indicates an encryption algorithm.

The format of the configuration option 123 is as follows:

| 123 | Len | 1 | Algorithm |
|-----|-----|---|-----------|
| 0   |     | Data... | |

The format of the configuration option 77 is as follows:

| 77 | Len | 1 | Algorithm |
|----|-----|---|-----------|
| 0  |     | Data... | |

The format of the configuration option 67 is as follows:

| 67 | Len | 1 | Algorithm |
|----|-----|---|-----------|
| 0  |     | Data... | |

(2) The solution of adding new configuration options is as follows.

In DHCP, a format of the configuration options is as follows: (options of the configuration are named configuration options as below)

| Code | Len | Data... |
|------|-----|---------| where Code represents codes of the configuration options, Len represents the length of the configuration options, and Data represents data stored in the configuration options.

A format of new configuration options is as follows:

| Code | Len | Key | Algorithm |
|------|-----|-----|-----------|
| C1   | C2  | C3  | ...       |

The Key field indicates an encryption key (might be a key index or a key identification). The Algorithm field indicates an encryption algorithm. The C1, C2 and C3 represent codes of the configuration options which require encryption by the DHCP client when the DHCP responds.

The DHCP client requests the DHCP server to encrypt option 123, option 77 and option 67 when the configuration options are responded: the DHCP client sends to the DHCP server a request into which the configuration options with the above format are added, where the Key field is set to 0 (indicating that no encryption key is appointed). The format of the new configuration options is as follows:

| Code | Len | 0  | Algorithm |
|------|-----|----|-----------|
| 123  | 77  | 67 | ...       |

A corresponding encryption algorithm is filled in the Algorithm field.

202: Relay agent options are encrypted by the DHCP relay agent.

The DHCP client and the DHCP relay agent may obtain a key of the client and the server in a manual configuration manner.

Upon receipt of the request sent from the DHCP client, the DHCP relay agent adds additional information into the request. The additional information is added to assist the DHCP server in address selection and parameters configuration and is encapsulated in the relay agent options. In the embodiment of the present invention, the key previously obtained in a manual configuration manner is used and the additional information options which require encryption are selected by the DHCP relay agent. Then the DHCP relay agent encrypts the added additional information in manner of modifying existing relay agent options and adding new relay agent option.

(1) The solution of modifying existing relay agent option is as follows.

In DHCP, a format of additional configuration options added by the relay agent which are carried in the request message from the DHCP relay agent is as follows: (additional configuration options are named relay agent options as below)

| Code | Len | Data ... |
|---|---|---| where Code represents codes of the relay agent options, Len represents the length of the relay agent options, and Data represents data stored in relay agent options.

A format of modified relay agent options is as follows:

| Code | Len | Flag | Algorithm |
|---|---|---|---|
| Key | | Data ... | |

The Flag field is added to identify whether the relay agent options need to be encrypted. For instance, a Flag of 0 represents that there is no need to encrypt the relay agent options while a Flag of 1 represents that there is a request to encrypt the relay agent options. The Key field indicates an encryption key (might be a key index). The Algorithm field indicates an encryption algorithm. When a user requests to encrypt user sensitive information corresponding to the relay agent options, the Flag field in the relay agent options in the request is set to 1.

The DHCP relay agent encrypts sub-option 7, sub-option 6 and sub-option 4 using a key with an index of 1: the DHCP relay agent forwards to the DHCP sever the request into which the encrypted DHCP relay agent options are inserted. Formats of the relay agent sub-options 7, 6 and 4 which require encryption are as follows, wherein the Algorithm indicates an encryption algorithm;

The format of the relay agent sub-option 7 is as follows:

| 7 | Len | 1 | Algorithm |
|---|---|---|---|
| 1 | | Data ... | |

The format of the relay agent sub-option 6 is as follows:

| 6 | Len | 1 | Algorithm |
|---|---|---|---|
| 1 | | Data ... | |

The format of the relay agent sub-option 4 is as follows:

| 4 | Len | 1 | Algorithm |
|---|---|---|---|
| 1 | | Data ... | |

The Key fields are set to 1 (indicating that a key with an index of 1 is used for encryption). In this solution, different indexes may be used to encrypt sub-options 7, 6, 4, wherein a longer key may be used to encrypt an option requesting for a higher protection level.

(2) The solution of adding a new relay agent option is as follows.

In DHCP, a format of the configuration options is as follows: (additional configuration options added by the relay agent are named relay agent options as below)

| Code | Len | Data ... |
|---|---|---| where Code represents codes of the relay agent options, Len represents the length of the relay agent options, and Data represents data stored in relay agent options.

A format of new relay agent options is as follows:

| Code | Len | Key | Algorithm |
|---|---|---|---|
| C1 | C2 | C3 | ... |

The Key field indicates an encryption key (might be a key index). The Algorithm field indicates an encryption algorithm. The C1, C2 and C3 represent codes of the relay agent options encrypted by the DHCP relay agent.

The sub-options 7, 6 and 4 are encrypted by the DHCP relay agent: the DHCP client sends to the DHCP server a request into which the configuration options with the above format are added, where the Key field is set to 3 (indicating that a key with an index of 3 is used for encryption). The format of the added configuration options is as follows:

| Code | Len | 3 | Algorithm |
|---|---|---|---|
| 7 | 6 | 4 | ... |

A corresponding encryption algorithm is filled in the Algorithm field.

203: The DHCP relay agent initiates a request to the DHCP server.

The relay agent options are added in the request sent from the DHCP relay agent to the DHCP serve. If the relay agent options are encrypted by the DHCP relay agent, then the encrypted relay agent options are carried in the request sent from the relay agent to the DHCP server.

The encrypted relay agent options are inserted in the request and are then forwarded to the DHCP server by the relay agent.

204: The relay agent options are decrypted by the DHCP server.

After the DHCP server receives the request from the DHCP relay agent, if the user of the DHCP client does not select and identify configuration options for encryption, then the DHCP server will encrypt the configuration options which require encryption based on previous settings in the DHCP server which are set by the user requesting for the encryption of the configuration options. If the user of the DHCP client selects and identifies configuration options for encryption, then the DHCP server will simultaneously encrypt the configuration options which are selected and identified for encryption by the user, based on previous settings in the DHCP server which are set by the user requesting for the encryption of the configuration options.

In the request, if the relay agent options are encrypted, the DHCP server will decrypt the relay agent options and will store the relay agent options which are used in address selection and parameters configuration.

After the DHCP server receives the request from the DHCP client, encrypts options 22, 23 and 34, which are previously set in the DHCP server by the user, using a key having an index of 2.

When the solution of modifying existing configuration options is adopted, the formats of the configuration options in a message containing the encrypted configuration options responded by the DHCP server are as follows, wherein the Algorithm indicates an encryption algorithm.

The format of the configuration option 22 is as follows:

| 22 | Len | 1 | Algorithm |
|----|-----|---|-----------|
| 2  | Data... | | |

The format of the configuration option 23 is as follows:

| 23 | Len | 1 | Algorithm |
|----|-----|---|-----------|
| 2  | Data... | | |

The format of the configuration option 34 is as follows:

| 34 | Len | 1 | Algorithm |
|----|-----|---|-----------|
| 2  | Data... | | |

The Key fields are set to 2 (indicating that a key with an index of 2 is used for encryption). In this solution, different indexes may be used to encrypt options 22, 23, 34, wherein a longer key may be used to encrypt an option requesting for a higher protection level.

When the solution of adding new configuration options is adopted, encrypted configuration options are added in the new configuration options in the responded message from the DHCP server to the DHCP client, which have a format as follows:

| Code | Len | 3 | Algorithm |
|------|-----|---|-----------|
| 22   | 23  | 34 | ... | where the Key field is set to 3 (indicating that a key with an index of 3 is used for encryption). In this solution, the same key is used to encrypt options 22, 23 and 34. In other words, for those configuration option's codes in the same configuration option added, the same key is used therein for encrypting those configuration options, whereas for options using different encryption keys, additional configuration options may be added and other keys may be used.

If the user of the DHCP client selects and identifies configuration options requesting for encryption, the DHCP server simultaneously encrypts the configuration options which are identified for encryption in the request, such as the configuration options requesting for encryption in step 101. The DHCP server encrypts option 123, option 77 and option 67 using a key with an index of 2: the DHCP server sends to the DHCP client via the DHCP relay agent a message which carries encrypted configuration options being requested to be encrypted in step 201.

When the solution of modifying existing configuration options is adopted, the format of the configuration options in a message containing the encrypted configuration options responded by the DHCP server are as follows, wherein the Algorithm indicates an encryption algorithm.

The format of the configuration option 123 is as follows:

| 123 | Len | 1 | Algorithm |
|-----|-----|---|-----------|
| 2   | Data... | | |

The format of the configuration option 77 is as follows:

| 77 | Len | 1 | Algorithm |
|----|-----|---|-----------|
| 2  | Data... | | |

The format of the configuration option 67 is as follows:

| 67 | Len | 1 | Algorithm |
|----|-----|---|-----------|
| 2  | Data... | | |

The Key fields are set to 2 (indicating that a key with an index of 2 is used for encryption). In this solution, different indexes may be used to encrypt options 123, 77, 67, wherein a longer key may be used to encrypt an option requesting for a higher protection level.

When the solution of adding new configuration options is adopted, the configuration options in the responded message from the DHCP server to the DHCP client are encrypted configuration options with a format as follows:

| Code | Len | 3 | Algorithm |
|------|-----|---|-----------|
| 123  | 77  | 67 | ... | where the Key field is set to 3 (indicating that a key with an index of 3 is used for encryption). In this solution, the same key is used to encrypt options 123, 77 and 67. In other words, for those configuration option's codes in the same configuration option added, the same key is used therein for encrypting those configuration options, whereas for options using different encryption keys, additional configuration options may be added and others keys may be used.

After the DHCP server receives the request in which the relay agent options are encrypted, the DHCP server decrypts the relay agent options and selects a policy, i.e., to encrypt the relay agent options in the request, or to directly duplicate and encapsulate the encrypted relay agent options in the request into a message sending to the DHCP relay agent.

Encryption procedures for the relay agent options by the DHCP server are as follows.

The DHCP server encrypts sub-options 7, 6 and 4 using a key with an index of 1. Formats of the relay agent options 7, 6 and 4 which require encryption are as follows, wherein the Algorithm indicates an encryption algorithm.

The format of the relay agent sub-option 7 is as follows:

| 7 | Len | 1 | Algorithm |
|---|---|---|---|
| 1 | Data... | | |

The format of the relay agent sub-option 6 is as follows:

| 6 | Len | 1 | Algorithm |
|---|---|---|---|
| 1 | Data... | | |

The format of the relay agent sub-option 4 is as follows:

| 4 | Len | 1 | Algorithm |
|---|---|---|---|
| 1 | Data... | | |

The Key fields are set to 1 (indicating that a key with an index of 1 is used for encryption). In this solution, different indexes may be used to encrypt sub-options 7, 6, 4, wherein a longer key may be used to encrypt an option requesting for a higher protection level.

The solution of adding the configuration options is as follows.

In DHCP, a format of the configuration options is as follow: (additional configuration options added by the relay agent are named relay agent options as below)

| Sub-Code | Len | Data... |
|---|---|---| where Sub-Code represents codes of the relay agent options, Len represents the length of the relay agent options, and Data represents data stored in relay agent options.

A format of the relay agent options after the sub-options fields in the relay agent options are is added is as follow:

| Sub-Code | Len | Key | Algorithm |
|---|---|---|---|
| C1 | C2 | C3 | ... |

The Key field indicates an encryption key (might be a key index). The Algorithm field indicates an encryption algorithm. The C1, C2 and C3 represent codes of the relay agent options encrypted by the DHCP relay agent.

The Key field is set to 3 (indicating that a key with an index of 3 is used for encryption). The format of the added configuration options is as follow:

| Sub--Code | Len | 3 | Algorithm |
|---|---|---|---|
| 7 | 6 | 4 | ... |

A corresponding encryption algorithm is filled in the Algorithm field.

205: The DHCP server responds a message to the DHCP relay agent.

206: The DHCP relay agent forwards the message to the DHCP client.

Upon receipt of the message from the DHCP server, the DHCP relay agent strips the relay agent options from the message and then forwards the message to the DHCP client, in other words, the relay agent options are not carried in the message sent from the DHCP relay agent to the DHCP server.

So far, the encrypted transmission for the user sensitive information is completed in the case that there lies the DHCP relay agent between the DHCP client and the DHCP server.

In some cases, the DHCP relay agent may send a DHCP request to the DHCP server in order to update information stored in the DHCP relay agent, wherein the request carries the relay agent options added by the DHCP relay agent. The DHCP server processes the request according to the relay agent options sent from the DHCP relay agent. For instance, the DHCP server decrypts the DHCP relay agent options carried in the request, or responds a message carrying the relay agent options to the DHCP relay agent.

Embodiment 3 is an embodiment illustrating a method for transmitting DHCP message between a DHCP relay agent and a DHCP server.

Figure 3:
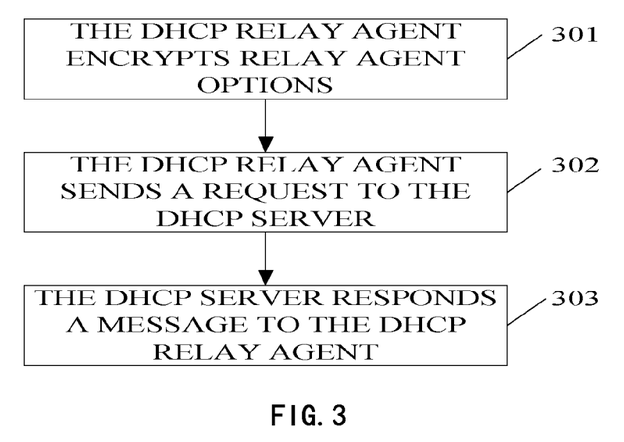
FIG. 3 is a system diagram of DHCP message transmission between a DHCP relay agent and a DHCP server according to an embodiment of the present invention.

Referring to FIG. 3, FIG. 3 is a flowchart of a method for transmitting DHCP messages between a DHCP relay agent and a DHCP server according to an embodiment of the present invention.

301: Relay agent options are encrypted by the DHCP relay agent.

The DHCP server and the DHCP relay agent may obtain a key in a manual configuration manner.

When the DHCP relay agent sends a request to the DHCP server, additional information is added in the request to assist the DHCP server in address selection and parameters configuration and is encapsulated in the relay agent options. In the embodiment of the present invention, the key previously obtained in a manual configuration manner is used and the additional information options which require encryption are selected by the DHCP relay agent. Then the DHCP relay agent encrypts the added relay agent option in a manner of modifying existing relay agent options and adding new relay agent option.

A format of additional configuration options added by the relay agent which are carried in the request message from the DHCP relay agent is as follows: (additional configuration options are named relay agent options as below)

| Code | Len | Data... |
|------|-----|---------| where Code represents codes of the relay agent options, Len represents the length of the relay agent options, and Data represents data stored in relay agent options.

A format of the relay agent options after the fields in the relay agent options are modified is as follows:

| Code | Len | Flag | Algorithm |
|------|-----|------|-----------|
| Key  |     | Data... |       |

The Flag field is added to identify whether the relay agent option need to be encrypted. For instance, a Flag of 0 represents that there is no need to encrypt the relay agent option while a Flag of 1 represents that there is a request to encrypt the relay agent option. The Key field indicates an encryption key (might be a key index). The Algorithm field indicates an encryption algorithm. When a user requests to encrypt user sensitive information corresponding to the relay agent option, the Flag field in the relay agent option in the request is set to 1.

The DHCP relay agent encrypts sub-option 7, sub-option 6 and sub-option 4 using a key with an index of 1: the DHCP relay agent forwards to the DHCP sever the request into which the encrypted DHCP relay agent options are inserted. Formats of the relay agent options 7, 6 and 4 which require encryption are as follows, wherein the Algorithm indicates an encryption algorithm.

The format of the relay agent sub-option 7 is as follows:

| 7 | Len | 1 | Algorithm |
|---|-----|---|-----------|
| 1 |     | Data... |     |

The format of the relay agent sub-option 6 is as follows:

| 6 | Len | 1 | Algorithm |
|---|-----|---|-----------|
| 1 |     | Data... |     |

The format of the relay agent sub-option 4 is as follows:

| 4 | Len | 1 | Algorithm |
|---|-----|---|-----------|
| 1 |     | Data... |     |

The Key fields are set to 1 (indicating that a key with an index of 1 is used for encryption). In this solution, different indexes may be used to encrypt sub-options 7, 6, 4, wherein a longer key may be used to encrypt an option requesting for a higher protection level.

The solution of adding new relay agent option is as follows.

In DHCP, a format of the configuration options is as follows: (additional configuration options added by the relay agent are named relay agent options as below)

| Code | Len | Data... |
|------|-----|---------| where Code represents codes of the relay agent options, Len represents the length of the relay agent options, and Data represents data stored in relay agent options.

A format of new relay agent option is as follows:

| Code | Len | Key | Algorithm |
|------|-----|-----|-----------|
| C1   | C2  | C3  | ...       |

The Key field indicates an encryption key (might be a key index). The Algorithm field indicates an encryption algorithm. The C1, C2 and C3 represent codes of the relay agent options encrypted by the DHCP relay agent.

The sub-options 7, 6 and 4 are encrypted by the DHCP relay agent: the DHCP relay agent sends to the DHCP server a request into which the encrypted relay agent options with the above format are added, where the Key field is set to 3 (indicating that a key with an index of 3 is used for encryption). The format of the new relay agent option is as follows:

| Sub-Code | Len | 3 | Algorithm |
|----------|-----|---|-----------|
| 7        | 6   | 4 | ...       |

A corresponding encryption algorithm is filled in the Algorithm field.

302: The DHCP relay agent sends to the DHCP server the request in which the encrypted relay agent options are carried.

303: The DHCP server responds a message to the DHCP relay agent.

After the DHCP server receives the request in which the relay agent options are encrypted, the DHCP server decrypts the relay agent information and selects a policy, i.e., to encrypt the relay agent options in the request, or to directly duplicate and encapsulate the encrypted relay agent options in the request into the message sending to the DHCP relay agent. The encrypted relay agent options are carried in the message sent from the DHCP server to the DHCP relay agent.

A system for transmitting DHCP message is also provided according to an embodiment of the present invention.

Figure 4:
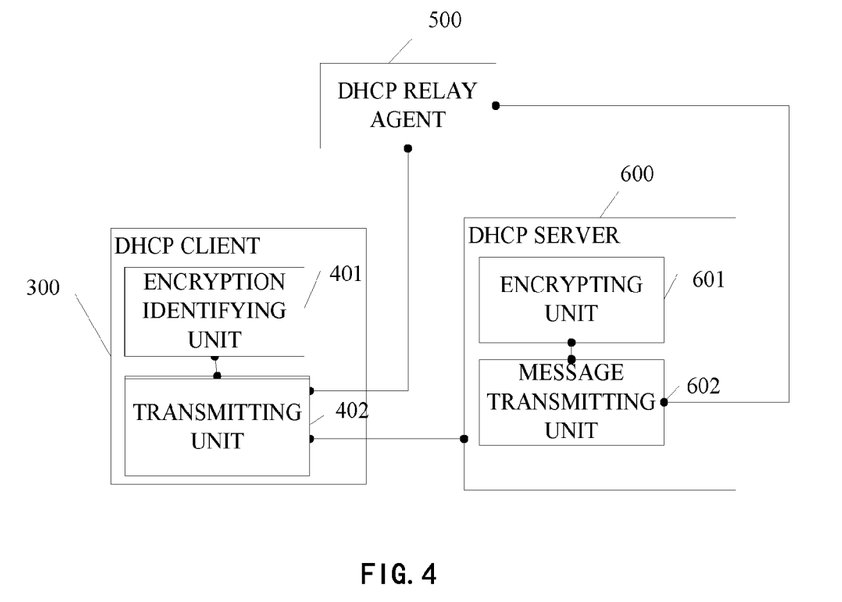
FIG. 4 is a system diagram of DHCP message transmission according to an embodiment of the present invention.

Referring to FIG. 4, FIG. 4 is a system structural diagram of DHCP message transmission according to an embodiment of the present invention. The system includes:

a DHCP client 400, configured to initiate a request to the DHCP server; and a DHCP server 600, configured to encrypt configuration options and to send a message containing the encrypted configuration options to the DHCP client 400.

The DHCP client 400 is further configured to identify configuration options which require encryption in the request; and the DHCP client 600 is further configured to encrypt the configuration options which require encryption.

The DHCP client 400 includes:

an encryption identifying unit 401, configured to identify the configuration options which require encryption in the request; and a transmitting unit 402, configured to send to the DHCP server 600 a request in which the configuration options identified for encryption are carried.

The DHCP server 600 includes:

an encrypting unit 601, configured to encrypt the configuration options and further to encrypt the configuration options identified for encryption; and a message transmitting unit 602, configured to send to the DHCP client 400 a message containing the encrypted configuration options, wherein the configuration options identified for encryption are further carried in the message.

The system for transmitting DHCP message may further include:

a DHCP relay agent 500, configured to forward the request sent from the DHCP client 400 to the DHCP server, and to forward the message containing the encrypted configuration options sent from the DHCP server 600 to the DHCP client 400.

The DHCP relay agent 500 may further encrypt relay agent options.

Figure 5:
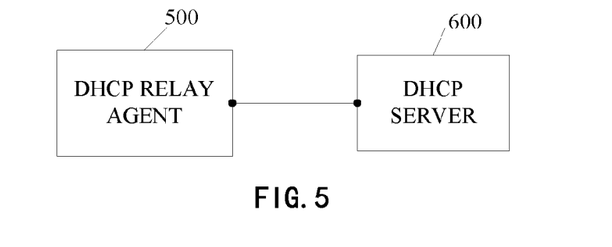
FIG. 5 is a system diagram of DHCP message transmission between a DHCP relay agent and a DHCP server according to an embodiment of the present invention.

Referring to FIG. 5, FIG. 5 is a system structural diagram of DHCP message transmission between a DHCP relay agent and a DHCP server according to an embodiment of the present invention. The system includes:

a DHCP relay agent 500, configured to encrypt the relay agent options and to send to the DHCP server 600 a request in which the encrypted relay agent options are carried; and a DHCP server 600, configured to process the encrypted relay agent options.

In the present embodiment, the DHCP server includes: a decrypting unit, configured to decrypt the relay agent options which have been encrypted; an information acquiring unit, configured to acquire the relay agent options base on a decryption result conducted by the decrypting unit.

A DHCP server is also provided according to an embodiment of the present invention, wherein an encrypting unit and a message transmitting unit are included in the DHCP server, and a message receiving unit may be further included therein. The encrypting unit is configured to encrypt the configuration options; the message transmitting unit is configured to send a message in which the encrypted configuration options are included; the message receiving unit is configured to receive a request in which configuration options identified for encryption are carried. As a result, if the configuration options identified for encryption are carried in the request which is received by the message receiving unit, the encrypting unit merely encrypts the configuration options identified for encryption in the message. In addition, the configuration options identified for encryption may be further carried in the message which is sent from the message transmitting unit to the DHCP client or to the DHCP relay agent.

In the above detailed descriptions of the embodiments of the present invention, the request to encrypt the configuration options is identified in the request according to the embodiments of the present invention, which may facilitate the user to select different configuration options for encryption based on requirements for each network access.

Furthermore, the DHCP relay agent is provided in the embodiments of the present invention to encrypt the relay agent options added by the DHCP relay agent. Consequently, the information added by the DHCP relay agent is protected from being stolen and the user sensitive information is protected thoroughly.

Methods and systems for transmitting DHCP message according to the present invention are presented above in details. Several specific examples are given to the present invention to illustrate the principle and implementation of the present invention. The description of the embodiments is intended merely to facilitate the understanding of the method and key ideas of the present invention. Meanwhile, it is readily appreciated by those skilled in the art that any modification can be made to the specific implementation and application with the spirit of the present invention. Accordingly, the content of the specification shall not be construed as a limitation to the present invention.

What is claimed is:

1. A method for transmitting a DHCP message, comprising:

receiving, by a Dynamic Host Configuration Protocol (DHCP) server, a DHCP request from a DHCP relay agent, wherein the DHCP request carries relay agent options encrypted by the DHCP relay agent; and decrypting, by the DHCP server, the encrypted relay agent options to obtain relay agent options, wherein the DHCP request identifies which carries configuration options carried in the DHCP request are to be encrypted, encrypting, by the DHCP server, configuration information which are identified in the DHCP request to be encrypted; and responding to a DHCP client with a message containing the encrypted identified configuration options.

2. The method of claim 1, wherein the encrypting of the configuration options comprises:

encrypting the configuration options which are carried in the request and are identified to be encrypted and the configuration options which requires encryption based on previous settings in the DHCP server.

3. The method of claim 2, wherein the configuration options which are carried in the request and are identified to be encrypted are carried in:

modified configuration options; or newly added configuration options.

4. A method for transmitting a DHCP message, comprising:

encrypting relay agent options by a DHCP relay agent; and forwarding, by the DHCP relay agent, to a DHCP server a request containing the encrypted relay agent options, wherein the request carries configuration options which are identified to be encrypted, decrypting, by a DHCP server, the encrypted relay agent options, encrypting, by the DHCP server, configuration options which are identified in the request to be encrypted; and responding to a DHCP client with a message containing the encrypted configuration options.

5. A DHCP server, comprising:

a message receiving unit, configured to receive a request from a DHCP client, wherein the request carries encrypted relay agent options and configuration options which are identified to be encrypted;

a decrypting unit, configured to decrypt the encrypted relay agent options;

an information acquiring unit, configured to obtain relay agent options based on a decryption result conducted by the decrypting unit;

an encrypting unit, configured to encrypt configuration options which are identified in the request to be encrypted; and a message transmitting unit, configured to send a message containing the encrypted identified configuration options to the DHCP client.

6. The DHCP server of claim 5, wherein the configuration options further comprises:
- configuration options which are carried in the request and are identified to be encrypted; and configuration options which requires encryption based on previous settings in the DHCP server.

7. A system for transmitting a DHCP message, comprising a DHCP relay agent, a DHCP client and a DHCP server,
wherein the DHCP relay agent comprises:
- means for encrypting relay agent options and forwarding a request identifying which configuration options carried in the DHCP request are to be encrypted and containing the encrypted relay agent options, to the DHCP server; and
- means for receiving a message carrying encrypted configuration options from the DHCP server and forwarding the message;

the DHCP client comprises:
- an encryption identifying unit, configured to identify, in a request, configuration options which are to be encrypted; and
- a transmitting unit configured to send the request to the DHCP server, wherein the request identifies which configuration options carried in the DHCP request are to be encrypted;

and the DHCP server comprises:
- a message receiving unit, configured to receive the request carries encrypted relay agent options;
- a decrypting unit, configured to decrypt the encrypted relay agent options;
- an information acquiring unit, configured to obtain the relay agent options based on a decryption result conducted by the decrypting unit,
- an encrypting unit, configured to encrypt configuration options which are identified in the request to be encrypted; and
- a message transmitting unit, configured to send a message containing the encrypted configuration options to a DHCP client.

8. The system of claim 7, wherein the configuration options further comprises:
- configuration options which are carried in the request and are identified to be encrypted; and configuration options which requires encryption based on previous settings in the DHCP server.

\* \* \* \* \*